United States Patent
Schrempf et al.

(10) Patent No.: US 11,414,786 B2
(45) Date of Patent: Aug. 16, 2022

(54) CELLULOSE FILAMENT PROCESS

(71) Applicant: LENZING AG, Lenzing (AT)

(72) Inventors: Christoph Schrempf, Bad Schallerach (AT); Andreas Gressenbauer, Schörfling am Attersee (AT); Franz Gugerell, Loosdorf (AT); Martin Neunteufel, Hong Kong (CN); Ernst Reiter, Schörfling (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 0 days.

(21) Appl. No.: 16/753,583

(22) PCT Filed: Oct. 8, 2018

(86) PCT No.: PCT/EP2018/077265
§ 371 (c)(1),
(2) Date: Apr. 3, 2020

(87) PCT Pub. No.: WO2019/068922
PCT Pub. Date: Apr. 11, 2019

(65) Prior Publication Data
US 2020/0332442 A1    Oct. 22, 2020

(30) Foreign Application Priority Data

Oct. 6, 2017 (EP) .................... 17001650

(51) Int. Cl.
*D01D 1/10* (2006.01)
*D01D 10/06* (2006.01)
(Continued)

(52) U.S. Cl.
CPC ............. *D01D 1/02* (2013.01); *B29C 48/05* (2019.02); *B29C 48/274* (2019.02);
(Continued)

(58) Field of Classification Search
CPC . B29C 48/92; D01D 1/02; D01D 1/10; D01D 1/106; D01D 5/06; D01D 10/06;
(Continued)

(56) References Cited

U.S. PATENT DOCUMENTS 5,055,207 A * 10/1991 Spaller, Jr. ............. D01D 1/106
                                                          210/805
5,403,530 A *  4/1995 Taylor ....................... D01F 2/00
                                                          264/187
(Continued)

FOREIGN PATENT DOCUMENTS

AT          505 492 A1     1/2009
CN         101429734 A     5/2009
(Continued)

OTHER PUBLICATIONS

Translation of DE 19954152 A1 (published on Jul. 20, 2000).*
(Continued)

*Primary Examiner* — Leo B Tentoni
(74) *Attorney, Agent, or Firm* — Venable LLP

(57) ABSTRACT

The present invention provides a process for the viable production of lyocell cellulose continuous filament yarns.

20 Claims, 1 Drawing Sheet

(51) Int. Cl.
*D01F 2/02* (2006.01)
*D01D 1/02* (2006.01)
*B29C 48/27* (2019.01)
*B29C 48/88* (2019.01)
*B29C 48/05* (2019.01)
*D01D 5/06* (2006.01)
*D01D 7/00* (2006.01)
*D01F 2/00* (2006.01)
*B29C 48/92* (2019.01)
*B29K 1/00* (2006.01)

(52) U.S. Cl.
CPC ............ *B29C 48/919* (2019.02); *B29C 48/92* (2019.02); *D01D 1/106* (2013.01); *D01D 5/06* (2013.01); *D01D 7/00* (2013.01); *D01F 2/00* (2013.01); *B29K 2001/08* (2013.01); *D10B 2201/20* (2013.01); *D10B 2201/22* (2013.01)

(58) Field of Classification Search
CPC ......... D01F 2/00; D01F 2/02; D10B 2201/20; D10B 2201/22
USPC ....... 264/40.6, 169, 178 F, 187, 203, 211.14, 264/211.15, 233, 234
See application file for complete search history.

(56) References Cited

U.S. PATENT DOCUMENTS

| | | | |
|---|---|---|---|
| 5,589,125 A | 12/1996 | Zikeli et al. | |
| 5,798,125 A | 8/1998 | Zikeli et al. | |
| 5,863,478 A | 1/1999 | Ruf et al. | |
| 5,942,327 A | 8/1999 | Budgell et al. | |
| 5,958,320 A * | 9/1999 | Pitowski | D01F 2/00 264/187 |
| 6,093,355 A | 7/2000 | Newbury et al. | |
| 6,159,601 A | 12/2000 | Pitowski et al. | |
| 6,190,596 B1 | 2/2001 | Budgell et al. | |
| 7,922,943 B2 | 4/2011 | Gerking | |
| 2003/0155673 A1 * | 8/2003 | Zikeli | D01F 2/00 264/40.6 |
| 2004/0099981 A1 | 5/2004 | Gerking | |
| 2008/0299160 A1 * | 12/2008 | Agboh | D01F 1/02 264/176.1 X |
| 2016/0326671 A1 | 11/2016 | Schrempf et al. | |

FOREIGN PATENT DOCUMENTS

| | | |
|---|---|---|
| DE | 19954152 A1 | 7/2000 |
| EP | 0853146 A2 | 7/1998 |
| EP | 1033385 A2 | 9/2000 |
| EP | 0823945 B1 | 10/2001 |
| JP | H-10-331027 A | 12/1998 |
| JP | H10-331027 A | 12/1998 |
| JP | 2000-516278 A | 12/2000 |
| JP | 2000-516652 A | 12/2000 |
| JP | 3852631 B2 | 12/2006 |
| RU | 2265089 C2 | 11/2005 |
| WO | 93/19230 A1 | 9/1993 |
| WO | 96/18760 A1 | 6/1996 |
| WO | WO-9738153 A1 * | 10/1997 ............ D01D 2/00 |
| WO | 98/06754 A1 | 2/1998 |
| WO | 9806754 A1 | 2/1998 |
| WO | 9806886 A1 | 2/1998 |
| WO | 98/30740 A1 | 7/1998 |
| WO | 01/81662 A1 | 11/2001 |
| WO | 02/18682 A1 | 3/2002 |
| WO | 02/072929 A1 | 9/2002 |
| WO | 03/014429 A1 | 2/2003 |
| WO | 03/014432 A1 | 2/2003 |
| WO | 03/014436 A1 | 2/2003 |
| WO | 2015/101543 A1 | 7/2015 |

OTHER PUBLICATIONS

International Search Report and Written Opinion issued in counterpart International Patent Application No. PCT/EP/2018/077265 (11 pages), dated Nov. 14, 2018.

* cited by examiner

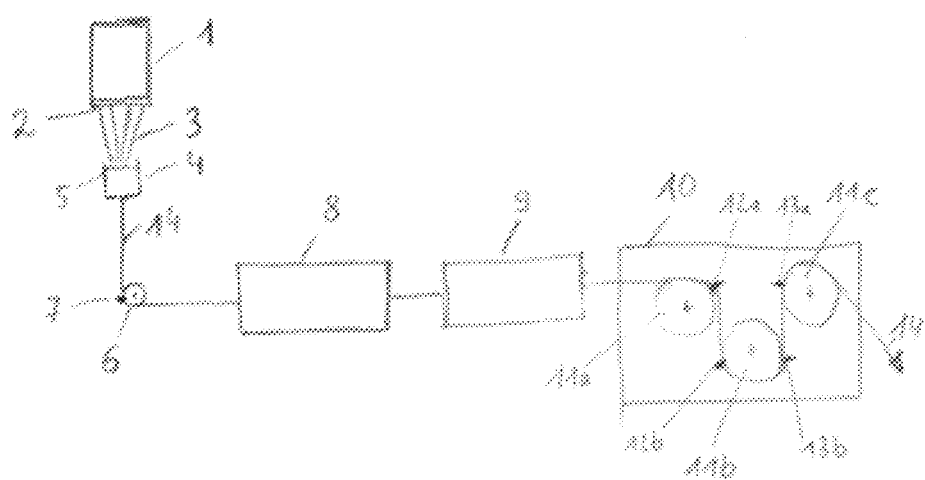

CELLULOSE FILAMENT PROCESS

The present application is a national-stage entry under 35 U.S.C. § 371 of International Patent Application No. PCT/EP2018/077265, published as WO 2019/068922 A1, filed Oct. 8, 2018, which claims priority to EP 17001650.5, filed Oct. 6, 2017, the entire disclosure of each of which is hereby incorporated by reference.

BACKGROUND OF THE INVENTION

Field of the Invention

The present invention relates the production of cellulose filament yarns.

Background

Continuous filament yarns are widely used in the textile industry to produce fabrics with a distinct character compared to fabrics produced from yarns made using staple fibers. A continuous filament yarn is one in which all of the fibers are continuous throughout any length of the yarn. A continuous filament yarn will commonly consist of 10 to 300 or more individual filaments which are all parallel to each other and the axis of the yarn when produced. The yarn is produced by extruding a solution or melt of a polymer or a polymer derivative and then winding the yarn produced onto a bobbin or reel or by forming a cake by centrifugal winding.

Synthetic polymer continuous filament yarns are common. For example, nylon, polyester and polypropylene continuous filament yarns are used in a wide variety of fabrics. They are produced by melt spinning a molten polymer through a spinneret with a number of holes corresponding to the number of filaments required in the yarn produced. After the molten polymer has started to solidify, the yarn may be drawn to orient the polymer molecules and improve the properties of the yarn.

Continuous filament yarns can also be spun from cellulose derivatives such as cellulose diacetate and cellulose triacetate by dry spinning. The polymer is dissolved in a suitable solvent and then extruded through a spinneret. The solvent evaporates quickly after extrusion causing the polymer to precipitate in the form of filaments forming a yarn. The newly produced yarn may be drawn to orient the polymer molecules.

Continuous filament yarns can also be produced from cellulose using the viscose process. Cellulose is converted to cellulose xanthate by reaction with sodium hydroxide and carbon disulphide and then dissolved in a sodium hydroxide solution. The cellulose solution, commonly called viscose, is extruded through a spinneret into an acid bath. The sodium hydroxide is neutralised causing the cellulose to precipitate. At the same time, the cellulose xanthate is converted back to cellulose by reaction with the acid. The newly formed filament is drawn to orient the cellulose molecules, washed to remove reactants from the filament and then dried and wound onto a bobbin. In earlier versions of this process, the wet yarn was collected into a cake using a centrifugal winder—a Topham Box. The cake of yarn was then dried in an oven before winding onto a bobbin.

Continuous filament cellulose yarns are also produced using the cupro process. Cellulose is dissolved in a solution of cuprammonium hydroxide. The resulting solution is extruded into a water bath where the cuprammonium hydroxide is diluted and the cellulose precipitates. The resulting yarn is washed, dried and wound onto a bobbin.

Cellulosic continuous filament yarn produced by either the viscose or the cupro process can be made into fabrics by weaving or knitting or other fabric forming processes. Fabrics produced are used for a variety of applications including linings for outerwear, ladies blouses and tops, lingerie and prayer rugs. Yarns are also produced for use in the reinforcement of tyres and other rubber products.

Fabrics made from continuous filament cellulose yarns can have a high lustre. They are good at moisture handling to enhance the comfort of the wearer. They do not generate static electricity as readily as fabrics made using continuous filament synthetic yarns.

However, fabrics made from currently available continuous filament cellulose yarns generally have poor physical properties. The dry strength and the tear strength are poor compared to fabrics made from synthetic polymers such as polyester. The wet strength is much lower than the dry strength due to interactions between the cellulose and water. The abrasion resistance is low. The interactions with water also soften the cellulose causing the fabrics made from the yarn to be unstable when wetted.

Due to these deficiencies, the products which were originally made using continuous filament cellulose yarns are now mainly produced using synthetic polymer continuous filament yarns such as polyester and nylon.

However, synthetic yarns do show certain drawbacks. Fabrics made using them do not have the moisture handling capability of fabrics made from cellulose yarns. Synthetic fabrics can generate static electricity. Some people consider garments made from synthetic yarns much less comfortable to wear compared with cellulose containing fabrics.

Accordingly there is a need for continuous filament cellulose yarns which would allow to produce fabrics and other textile products that have the positive characteristics of currently available fabrics made from continuous filament cellulose yarns but with the performance usually associated with fabrics made using continuous filament synthetic yarns.

It has surprisingly been found that continuous filament yarns produced by the lyocell process have considerably higher tensile strength than filament yarns produced by the viscose process. This can result in fabrics with better strength, tear strength and abrasion resistance. The loss of strength when lyocell filaments are wetted is much lower than for viscose filaments. This means that lyocell fabrics are more difficult to deform when wet giving better fabric stability. Lyocell fabrics are also stronger when wet compared to equivalent viscose fabrics.

It has also been surprisingly found that fabrics produced from lyocell continuous filaments can have the lustre, moisture handling properties and low static generation that are the desirable characteristics of continuous filament viscose and cupro fabrics.

Lyocell technology is a technology based on the direct dissolution of cellulose wood pulp or other cellulose-based feedstock in a polar solvent (for example n-methyl morpholine n-oxide, hereinafter referred to as 'amine oxide') to produce a viscous highly shear-thinning solution which can be formed into a range of useful cellulose-based materials. Commercially, the technology is used to produce a family of cellulose staple fibers (commercially available from Lenzing A G, Lenzing, Austria under the trademark TENCEL®) which are widely used in the textile and nonwovens industries. Other cellulose products from lyocell technology such as filaments, films, casings, beads & nonwoven webs have also been disclosed.

EP 823945 B1 discloses a process for the manufacture of cellulose fibers, which comprises the extrusion and coagulation of a cellulose spinning solution in accordance with the lyocell process, mandatorily comprising a step of drawing the filaments and cutting the filaments into cellulose fibers, which may be used in various fields of application. Process step of drawing the coagulated cellulose filaments is essential according to the teaching of this prior art technology in order to obtain in particular staple fibers with a desired balance of properties.

EP 0 853 146 A2 discloses a process for the preparation of cellulosed based fibers. According to the teaching of this document two different raw materials having widely differing molecular weights are mixed in order to obtain fibers. WO 98/06754 discloses a similar method, which require that the two different raw materials are first dissolved separately, before admixing the prepared solution to obtain a spinning solution. DE 199 54 152 A1 discloses a method of preparing fibers, wherein spinning solutions having a relatively low temperature are employed.

The benefits of cellulose filament yarns produced from lyocell spinning solution have been described (Kruger, Lenzinger Berichte %4, S. 49 ff.). However, the prior art regarding production of lyocell staple fibres or cellulose filament yarns via known processes does not provide teaching on how to manufacture continuous filament lyocell yarns in a viable manner.

Accordingly, known processes do suffer from the drawback that commercially viable processes are not yet know, as the filament and yarn quality obtained by prior art processes to form lyocell filaments are not satisfactory. In addition, prior art teachings regarding fiber and filament production from other process technologies (viscose, synthetic filaments) is not applicable to lyocell processes due to the demanding requirements of high polymer extension directly after extrusion followed by controlled solvent removal via liquor exchange.

The preparation of continuous filament lyocell yarns therefore presents new process challenges compared to lyocell staple fibre production, primarily due to much higher production speeds, filament uniformity requirements and the need for exceptional process continuity:

Filament production speeds in excess of ten times faster than for staple fiber production are typical In a continuous filament yarn product, properties of all individual filaments must be within a very narrow window of variability, for example to prevent problems such as variation in uptake of dye. For example, a coefficient of variance of denier distribution must be less than 5%. On the other hand, in a staple fiber process, there is much more scope for 'averaging out' of minor variations between individual filaments because each bale of fibers consists of several million individual fibers obtained from filaments which have been cut to required length and blended. An example of the formation of lyocell staple fibers is disclosed in EP 823 945 B1.

Very high purity levels of spinning solution are necessary to minimize filament breakage during the extension step. Breakages can lead to loss of individual filaments leading to yarns no longer complying with the required specification and, potentially, loss of spinning continuity. Staple fiber production processes are tolerant of a certain proportion of individual filament breakages.

Object of the Invention

Accordingly it is the object of the present invention to provide a process enabling the production of lyocell filaments and of lyocell multifilament yarns with a high quality and process control making the overall process commercially viable.

BRIEF DESCRIPTION OF THE INVENTION

Accordingly the present invention provides the process as defined in claim 1. Preferred embodiments are given in claims 2 to 10 and the specification.

Further the present invention provides the filaments and yarns obtained, as defined in claim 11 and the present application.

BRIEF DESCRIPTION OF THE FIGURE

FIG. 1 shows a schematic representation of a process according to the present invention.

DETAILED DESCRIPTION OF THE INVENTION

The limitations of the state of the art have been overcome by the invention disclosed herein. Namely the present invention provides a process for producing lyocell filaments and lyocell multifilament yarns. The present invention will be described in detail referring to the individual process steps. It is to be understood, that these process steps and their respective preferred embodiments can be combined as appropriate and that the present application covers these combinations and discloses same, even if not explicitly described herein.

Manufacture of Spinning Solution.

It has been found that known production conditions for lyocell spinning solutions are not suitable for the production of lyocell continuous filaments. To achieve the required performance, product uniformity and consistency it is required to employ a cellulose starting material which complies with the following requirement:

The rheological properties of known lyocell spinning solutions are not compatible with the demands of high speed filament yarn production. For example, unacceptable numbers of filament breakages are encountered when using spinning solution compositions known for staple fiber production. It has been found that using a broader molecular weight distribution of the cellulose raw material than previously disclosed overcomes this problem, namely by blending 5-30 wt.-%, preferably 10 to 25 wt.-% of cellulose having a scan viscosity in the range of 450-700 ml/g with 70-95 wt.-%, preferably 75 to 90 wt.-% cellulose having a scan viscosity in the range of 300-450 ml/g, wherein the two fractions have a difference in scan viscosity of 40 ml/g or more, preferably 100 ml/g or more. The scan viscosity is determined in accordance with SCAN-CM 15:99 in a cupriethylenediamine solution, a methodology which is known to the skilled person and which can be carried out on commercially available devices, such as the device Auto PulpIVA PSLRheotek available from psl-rheotek.

To obtain such a cellulose raw material (for example from woodpulp) to achieve required molecular polydispersity blends of different types of starting materials may be used. Optimum blend ratios will depend on actual molecular weight of each blend component, filament production conditions and specific product requirements of the filament yarn. Alternatively, required cellulose polydispersity could also be obtained for example during manufacture of woodpulp, via blending prior to drying. This would remove the requirement to carefully monitor and blend pulp stocks during lyocell manufacture.

The overall content of cellulose in the spinning solution typically is from 10 to 20 wt.-%, preferably 10 to 16 wt.-%, such as from 12 to 14 wt.-%. As the skilled person is aware of the required components for spinning solutions for a lyocell process, no further detailed explanations of the components and the general production method is deemed to be required here. Reference in this respect is made to U.S. Pat. No. 5,589,125, WO 96/18760, WO 02/18682 and WO 93/19230, incorporated herein by reference.

To further control the process in accordance with the present invention, it is preferred to employ high levels of process monitoring and control to ensure uniformity of composition of the spinning solution. This may include in-line measurement of spinning solution composition/pressure/temperature, in-line measurement of particulate content, in-line measurement of spinning solution temperature distribution in jets/nozzles and regular off-line cross-checks.

It is further preferred to control and, if required to improve the quality of the lyocell spinning solution used in the present invention, as contents of large particles can result in unacceptable breaks in individual filament as they are being formed. Examples of such particles are impurities, such as sand, etc. but also gel particles comprising cellulose not sufficiently dissolved. One option to minimize the content of such solid impurities are filter processes. Multi-stage filtration of the spinning solution is the optimum way to minimize solid impurities. A skilled person will understand that greater filter stringencies are required for finer filament titers. Typically, for example, depth filtration with an absolute stopping power around 20 microns has been found to be effective for 1.3 decitex filaments. 15 micron absolute stopping power is preferred for finer filament decitex. Devices and process parameters for carrying out filtering are known to the skilled person.

In addition it has been found suitable to adjust the viscosity of the spinning solution to a range of from 500-1350 Pa·s, measured at a shear rate of 1.2 (1/s) at 110° C.

The temperature of the spinning solution during its preparation typically is in the range of form 105 to 120° C., preferably 105 to 115° C. Prior to the actual spinning/extrusion the solution, optionally after filtering, is heated to a higher temperature, using processes and devices known to the skilled person, of typically from 115 to 135° C., preferably 120 to 130° C. This process, together with a filtering step increases the homogeneity of the spinning solution after its initial preparation in order to provide the spinning solution (sometimes called spinning mass) suitable for extrusion through the spinning nozzles. This spinning solution preferably is then, prior to extrusion/spinning, brought to a temperature of from 110° C. to 135° C., preferably 115° C. to 135° C., a process which may include intermediate cooling and heating stages as well as tempering stages (stages where the spinning solution is kept at a given temperature for a certain time). Such processes are known tot eh skilled person.

Extrusion of Filaments

It has been found that uniformity and consistency of flow of the spinning solution through each spinneret nozzle hole further improves the process and helps to meet the quality requirements for the individual cellulose filaments and in turn also those for multifilament yarns. This is in particular relevant in view of the very high production speeds required for filament and filament yarn production, which are in the range of from 200 m/min and upwards. In accordance with the present invention production speeds of 200 m/min and upwards can be achieved, such as 400 m/min or more, preferably 700 m/min or more and even up to 1000 m/min or more. Suitable ranges are from 200 to 1500 m/min, such as from 400 to 1000 m/min or from 700 to 1000 m/min, including ranges such as from 700 to 1500 m/min.

Each spinneret piece used for extrusion of lyocell spinning solution has a number of nozzle holes corresponding to the number of filaments required for a continuous filament yarn. Multiple yarns can be extruded from a single jet by combining multiple spinneret pieces into a single spinneret plate, for example as disclosed in WO03014429 A1, incorporated herein by reference.

The number of nozzle holes for each filament yarn may be selected depending on the type of yarn intended, but the number is typically in the range of from 10 to 300, preferably 20 to 200, such as from 30 to 150.

Uniformity of spinning solution flow may be improved by providing a good temperature control within the spinneret and the individual nozzles. It is preferred, that during spinning the temperature variance within the nozzles (and between the nozzles is as small as possible, and preferably within ±2° C. or less. This may be achieved via a means of providing direct heating to the spinneret and the individual nozzles in a series of different zones, to enable compensation for any local differences in temperature of spinning solution and to give precise control of the temperature of the spinning solution as it is extruded from each spinneret nozzle .Examples of such temperature control means are disclosed in WO 02/072929 and WO 01/81662, incorporated herein by reference.

Spinneret nozzle profiles preferably are designed to maximize smooth acceleration of spinning solution through the nozzle while minimizing pressure drop. Key design features of the nozzle include, but are not limited to, a smooth inlet surface and sharp edges at nozzle outlet.

Initial Cooling

After exiting the spinning nozzles, the individual filaments are typically subjected to a cooling process, typically using an air flow. Accordingly, it is preferred to cool the filaments in this step by using an air draught, preferably a controlled cross draught in an air gap. The air draught should have a controlled humidity in order to obtain the desired cooling effect without detrimental effect on the quality of the fibers. Suitable humidity values are known to the skilled person. However, a direct application of known lyocell staple fiber procedures in this step does not work, as this would require, taking the high filament production speeds into account, a very long air gap (over 200 mm). Such an air gap however is not feasible, as the individual filaments would move and touch, leading to filament fusion and poor product quality. For the same reason, it has been found that the high velocity air cross draughts disclosed for staple fiber production may pose problems. In addition, greater uniformity and consistency of extension is required for filament products compared to staple fibers.

Thus, the present invention provides new means to adjust the filament production processing in order to meet quality requirements of filament yarn production.

For example, WO03014436 A1, incorporated herein by reference, discloses a suitable cross draught arrangement. Uniform filament cooling over the full length of the air gap is preferred.

As outlined above, the longer air gaps which would be considered as being required in accordance with the common understanding of the spinning process in particular under consideration of the high production velocities are not feasible. However, it has been found that a longer air gap length than typically employed for staple fiber production may be used successfully, such as around 40-130 mm. Preferably the air gap is in the range of from 40 to 120 mm, such as from 50 to 100 mm. In embodiments this may be combined with wider filament separation at the spinneret face (around twice the nozzle separation employed in lyocell staple fiber production). Such an arrangement has been found to be beneficial for filament production. An increase in filament separation in this manner reduces the opportunity for filaments to touch and enables the required uniform filament cooling to be achieved.

Cross-draught velocities are preferably much lower than used in lyocell staple fiber production. Suitable values are 0.5-3 m/sec, preferably 1-2 m/sec. Humidity values may be in the range of from 0.5 to 10 g water per kg air, such as from 2 to 5 g water per kg air. The air temperature preferably is controlled to a value of below 25° C., such as below 20° C.

Initial Coagulation of Filaments

After exiting the spinneret nozzles and having been cooled in the air gap, the filaments produced have to be treated to further initiate coagulation. This is achieved by means of entering the individual filaments into a coagulation bath, also called spinning bath or spin bath. It has been found that in order to achieve a high degree of uniformity of product quality, this further initial coagulation of the filaments preferably occurs within a small window, i.e. with only a minor variability, preferably at precisely the same point.

It has been found that traditional spin bath designs are often not suitable for this purpose because the hydrodynamic forces due to high filament speeds (above around 400 m/min) disturb the bath surface resulting in uneven initial coagulation (and variable air gap size) as well as potential filament fusion and other damage. It has been determined that in case of such problems it is preferable to use shallow spin baths, having a depth of below 50 mm.

Such spin baths are disclosed for example in WO03014432 A1, incorporated herein by reference, which discloses shallow spin bath depths in the range of from 5-40 mm, preferably 5 to 30 mm, more preferably 10-20 mm. The use of such shallow spin baths enables to control contact point of the spun filaments with the coagulation solution in the spin bath, thereby avoiding the problems which may occur when using conventional spin bath depths.

In addition it has been found that filament quality can also be improved if the concentration of amine oxide within the spin bath is controlled to values smaller than typically used in lyocell fiber production. Spin bath concentrations of below 25 wt.-%, more preferably below 20 wt.-% amine oxide, even more preferably preferably below 15 wt.-% have been found to improve filament quality. Preferred ranges for the amine oxide concentration are from 5 to 25 wt.-%, such as from 8 to 20 wt.-% or from 10 to 15 wt.-%. This is significantly below the range disclosed for lyocell staple fiber production. To enable the maintenance of such a low amine oxide concentration continuous monitoring of the composition of the spin bath is preferred, so that for example adjustments of the concentration may be carried out by replenishing water and/or by selective removal of excess amine oxide.

The temperature of this spin bath typically is in the range of from 5-30° C. preferably 8-16° C.

Similar to the preferred embodiments disclosed above for the spinning solution, high stringency spin bath liquor filtration is possible, to minimize potential to damage freshly-formed tender filaments by undesired solid impurities within the spin bath. This is particularly important at very high production speeds, in excess of 700 m/min.

Within the spinning bath the individual filaments of a target final yarn are brought together and are bundled into an initial multifilament bundle by means of the exit from the spinning bath, which is typically a ring shaped exit, which brings the filaments together and also serves to control the amount of spinning bath solution exiting the bath together with the filament bundle. Suitable arrangements are known to the skilled person. The shape as well as the choice of material for the ring shaped exit influences the tension applied to the filament bundles, as at least some of the filaments are in contact with the ring shaped exit. A skilled person will be aware of suitable materials and shapes for those exits from the spinning bath in order to minimize any negative impact on the filament bundle.

Accordingly, in a preferred embodiment of the process in accordance with the present invention, the process comprises the steps of manufacture of a spinning solution suitable for the lyocell process comprising from 10 to 15 wt %, preferably from 12 to 14 wt % of cellulose, wherein the cellulose is the above-described blend of celluloses having different scan viscosity values. This process furthermore comprises the step of extrusion of the spinning solution through extrusion nozzles while maintaining a temperature variability through the extrusion nozzles within a range of ±2° C. or less. The filaments thus produces are subjected to an initial cooling as described above, followed by the initial coagulation of filaments obtained in this manner occurs in a coagulation bath (spin bath) having a depth of less than 50 mm, preferably from 5 to 40 mm, more preferably from 10 to 20 mm.

The composition of the coagulation liquor employed in this coagulation bath shows a concentration of amine oxide of 23 wt % or less, more preferably below 20 wt %, and even more preferably below 15 wt %. Adjustment of this amine oxide content may be achieved by means of selective removal of amine oxide and/or by replenishing fresh water to adjust the concentration to the preferred ranges.

Such a process ensures that filaments with a high quality and, in particular, a high uniformity can be obtained, which particularly enter the coagulation bath in a manner ensuring uniform coagulation and therefore uniform filament properties. In addition, in embodiments of the process described above, it is preferred to adjust the distance between the individual filaments upon extrusion, for example by employing a wider nozzle separation, compared with standard lyocell staple fiber production processes, as further described below. These preferred process parameters and conditions enable, as indicated herein, the production of lyocell filaments with a high uniformity, while also enabling the desired high process velocities (spinning velocities of 200 m/min or more, more preferably 400 m/min or more, and in embodiments as high as 700 m/min or more). In this context, the present invention furthermore enables the continuous and long-term production of cellulose lyocell filaments and corresponding yarns as the process parameters and conditions as explained above avoid filament breakage etc., which would require stoppage of filament and yarn production.

Filament Extension

After exiting the spinning bath the multifilament bundles are taken up, typically by means of a guidance roller which directs the bundle, which will yield the final yarn, towards the subsequent processing stages, such as washing, drying and winding. During this step preferably no stretching of the filament bundle occurs. The distance between the exit from the spinning bath and the contact with the guidance roller may be selected according to need and distances of between 40 and 750 mm, such as from 100 to 400 mm have been shown as being suitable. It has been found that this process step can provide further options to control and influence product quality. In this process step for example filament crystalline structure may be adjusted, thereby achieving the desirable properties of lyocell continuous filament yarns. As indicated above, and as derivable form the wording of claim 1, success in this process step has been found to be closely linked to spinning solution rheology and consistency of extrusion from nozzles, a described above.

As indicated above, a means such as a guidance roller takes up the filaments, assembles same to form the initial yarn and guides the yarn thus obtained towards further processing steps. In accordance with the present invention it is preferred, that a maximum tension applied to the filament bundle at the contact point of the filament bundle (yarn) with the guidance roller is $(4.2 \times \text{filament number/filament titer})^{0.69}$ (cN) or less. This tension means the tension applied to the filaments/filament bundle from the point of exit from the spinning nozzles to the fist contact point, for example with the guidance roller provided after the coagulation step. The formula provided above defines, by means of illustration, that the maximum tension, for example for a filament bundle of 60 filaments with a yarn titer of 80 dtex (inividual filaments have a titer of 1.33 dtex), that the maximum tension is $(4.2 \times 60:1.33)^{0.69}$ accordingly 37.3 cN.

By maintaining such a specified maximum tension it can be ensured that filament breakage is prevented so that high quality yarns may be obtained. In addition this helps to ensure that the filament production process can run for the required times without disturbance. A skilled person will understand that the tension referred to herein is a tension which is to be measured using samples taken from the overall process by using a three roll testing apparatus Schmidt-Zugspannungsmessgerat ETB-100. The tension measured for filaments and filament bundles at the designated point of contact referred to herein may, using the process parameters disclosed here in the context of the present invention, be used to control product quality and process stability, in particular by adjusting the composition of the spinning solution, the spin bath depth and the spin bath liquor (coagulation bath) composition, the air cross draught as well as spinneret design, such as nozzle design and nozzle separation, in order to adjust the tension values to values conforming to the equation provided above.

Filament Washing.

As the filaments after initial coagulation and cooling still contain amine oxide, the filaments and/or yarns obtained typically are subjected to washing. Amine oxide may be washed from the newly formed yarns via a counter-current flow of demineralised water or other suitable liquid, typically at 70-80° C. As with the earlier process steps, it has been found that traditional washing techniques, for example use of troughs, may pose problems in view of the high production speeds above around 400 m/min. In addition, uniform application of wash liquor to each individual filament is preferred, to obtain a high quality product. At the same time minimal contact between the tender filaments and washing surfaces is preferable in order to maintain integrity of the filaments, to achieve target yarn properties. Further, individual filament yarns must be washed close together and line length should be minimized to enable viable process economics. In view of the above it has been found that a preferred washing process involves the following, alone or in combination:

Washing preferably is carried out using a series of driven rollers and each yarn is subjected individually to a series of wash liquor impregnation/liquor removal steps.

It has been found beneficial to provide a means of stripping or spinning liquor uniformly from each yarn filament, without damaging the tender filaments, after each wash impregnation step. This may for example be achieved via a suitably designed and positioned pin guides. The pin guides may, for example be constructed with a matt chrome finish. The guides allow close spacing of filament yarns (around 3 mm), good contact with filaments to give uniform liquor removal and low tension to minimize filament damage.

Optionally, an alkaline washing step may be included to increase removal efficiency of residual solvent from the filaments.

Used wash liquor (after first pin guide) typically has a concentration of 10-30%, preferably 18-20% amine oxide prior to return to solvent recovery.

A 'soft finish' may be applied to aid further processing. Types and application methods will be known to those skilled in the art. For example, a 'lick-roller' arrangement applying around 1% finish on the filaments, followed by a nip roller to control yarn tensions into the dryer has been found to be effective.

Yarn Ddrying

Again, good control of this step assists in the development of optimal yarn properties and minimizing potential for filament damage. Drying means as well as drying parameters are known to the skilled person. Preferred embodiments are defined in the following:

The dryer consists for example of 12-30 heated drums of around 1 m diameter. Individual speed control is preferred to ensure filament tension is kept low and constant, preferably below 10 cN, preferably below 6 cN. Spacing between yarns through drying may be around 2 to 6 mm.

Initial temperature in dryer is around 150° C. In later stages of the drying process temperatures may be lower, as drying progresses.

An antistatic agent and/or a soft finish may be applied to the filament yarns after drying, by means known to those skilled in the art.

Further process steps, for example combining, texturising or intermingling yarns, may be applied after drying and prior to collection, using processes known to the skilled person. If desired, a soft finish may be applied to the yarns prior to the above identified steps.

Collection of Yarns

Yarns may be collected using standard winding equipment. A suitable example is a bank of winders. Winder speed is used to fine tune process speeds upstream to maintain low and constant yarn tension.

A skilled person will understand that various modifying substances, such as dyestuffs, antibacterial products, ion-exchanger products, active carbon, nanoparticles, lotions, fire-retardant products, superabsorbers, impregnating agents, dyestuffs, finishing agents, crosslinking agents, grafting agents, binders; and mixtures thereof can be added during preparation of the spinning solution or in the washing zone, as long as these additions do not impair the spinning process. This allows to modify the filaments and yarns produced in order to meet individual product requirements. The skilled artisan is well aware of how to add such above-referenced materials in which step of the lyocell filament yarn production process. In this regard it has been found that many desirable modifying substances which would normally be added at the washing stage will not be effective with the filament yarn route because of the high line speeds and hence short residence times. In order to introduce these modifying substances an alternative approach is to collect fully washed but 'never-dried' filament yarns and submit these to further processing batch-wise where residence time would not be a limiting factor.

An illustrative process in accordance with the present invention is described by means of reference to FIG. 1. In FIG. 1, item (1) shows the spinneret, with the numeral (2) designating spinning holes (nozzles) from which individual filaments (3) are extruded. The reservoir containing the spinning solution and any preceding steps, such as filtering steps, are not shown in FIG. 1 but the skilled person will understand how the spinning solution enters into the spinneret. Numeral (4) designates the precipitation or coagulation bath while numeral (5) designates the surface of the coagulation bath. As indicated herein, the individual filaments (3) exiting the spinning holes are guided through the coagulation bath and exit the coagulation bath in accordance with standard procedures. The individual filaments are then being taken up by a guidance roller, thereby forming the filament bundle (14), which ultimately forms the multi-filament yarn in accordance with the present invention. Numeral (7) designates the first contact point of the filament bundle (14) with the guidance roller (6). In accordance with the description provided herein, it is preferred when the maximum tension applied to the filament bundle between first contact point with guidance (7) and the ending of the spinning holes (2) is as defined herein, as such a maximum tension ensures the production of high quality filaments and yarns while maintaining the process conditions in a manner enabling a stable and long term production of multi-filament yarns. The filament bundle (14) is then guided towards a washing treatment (8) and an optional after-treatment unit (9), followed by the drying unit (10), which may comprise various heated drums (11a, 11b, 11c) yielding a dried multi-filament yarn (14a) exiting the drying unit. As explained above, it is preferred when drying is carried out in a manner ensuring a constant and rather low filament tension of 10 cN/80 dtex or less. In accordance with the above, high quality multi-filament yarns may be produced in a reliable and commercially viable manner.

In accordance with the process as described herein, cellulose filaments as well as cellulose yarns being lyocell filaments and lyocell yarns may be produced. The properties of the filaments and yarns produced may be adjusted in accordance with the respective requirements for the desired end-use, such as number of filaments per yarn, filament tighter, total yarn tighter as well as other properties of the filaments and yarns.

The following example illustrates the process further:

Pulp (cellulose) was impregnated with a 78% watery N-methyl-morpholine-N-oxide (NMMO) solution, and low amounts of stabilizers. The resulting suspension contained 11.6% cellulose, 67.8% NMMO, 20.6% water and stabilizer GPE. The pulp consisted of a mixture of 80% with a viscosity SCAN 350 ml/g and 20% with a viscosity SCAN 600 ml/g. Excess water was removed form the slurry under shear and heating to obtain a fiber free cellulose solution comprising 13% cellulose, 73.8% NMMO and 11.2% water.

The cellulose solution was filtered, tempered to get a spinning solution and extruded at 112° C. in a dry-wet process, wherein the spinning solution was extruded through nozzles into a 60 mm high air gap. For stabilizing the extrusion process, the air gap was provided with a conditioned air stream of 2.5 m/sec, with 2 g moister per kg air and 17° C.

After crossing the air gap, the cellulose precipitated in a 24 mm high initial spin bath containing 12% NMMO, the rest being water with a filament yarn tension of 27 cN.

The endless filaments thus obtained were washed with water, impregnated with finish, dried and winded to a bobbin. Washing took place in fully de-salted water at 50° C. in counter current flow with a 25 times wash fluid cycle. For drying, a contact drum dryer was used with 3 temperature zones (155/140/100° C.), which reduced humidity to 10.5%. The tension of the filament bundle was 17 cN.

Spinning velocity was 500 m/min.

The invention claimed is:

1. A process for the production of lyocell type cellulose filament yarns from a lyocell spinning solution of cellulose in an aqueous tertiary amine oxide comprising the following steps:
    manufacturing a spinning solution containing 10 to 20 wt.-% cellulose, wherein the cellulose is a blend of 5-30 wt.-% of a cellulose having a scan viscosity in the range of 450-700 ml/g with 70-95 wt.-% of cellulose having a scan viscosity in the range of 300-450 ml/g, wherein the two fractions do show a difference in scan viscosity of at least 40 ml/g;
    extruding the spinning solution through extrusion nozzles to obtain filaments;
    guiding the filaments through an air gap having a length in the range of from 40 to 130 mm;
    coagulating the filaments via a spin bath containing a coagulation liquor with a concentration of tertiary amine oxide of 20% or less, wherein the spin bath has a depth of from 5 to 30 mm;
    washing the filaments; and
    drying the filaments.

2. The process according to claim 1, wherein a multifilament yarn is produced.

3. The process according to claim 1, wherein the filaments after exiting the nozzles are contacted with a cross draught air-flow of 0.5-3 m/sec.

4. The process according claim 1, wherein the air gap is provided between an exit of the nozzles and a surface of the spin bath.

5. The process according to claim 1, wherein the filaments are taken up by a guidance roller after exiting the spin bath.

6. The process according to claim 4, wherein a maximum tension applied to a filament bundle at a contact point of the filament bundle with a guidance roller is (4.2 ×filament number/filament titer)0.69 (cN) or less.

7. The process according to claim 1, wherein in the drying is carried out at a constant filament tension below 10cN per 80 dtex.

8. The process according to claim 1, wherein a temperature variability through the extrusion nozzles is controlled to ±2° C. or less.

9. The process according to claim 1, further comprising the washing of yarns.

10. The process according to claim 1, wherein the spinning solution is subjected to a filtration step prior to filament formation.

11. The process according to claim 1, wherein the spin bath has a concentration of the tertiary amine oxide of from 8 to 20 wt.-%.

12. A filament or multifilament yarn, obtained by the process of claim 1.

13. The process according to claim 9, wherein the washing of yarns is via a series of modular devices which enable uniform application and removal of washing liquor.

14. The process according to claim 10, wherein the spinning solution is subjected to the filtration step prior to filament formation using a multi-stage depth filtration with an absolute stopping power below 20 microns.

15. The process according to claim 10, wherein a multi-stage depth filtration has an absolute stopping power less than 15 microns.

16. The process according to claim 1, wherein the air gap is provided between an exit of the nozzles and a surface of the spin bath, having a length in the range of from 50 to 100 mm.

17. The process according to claim 1, wherein the spin bath has a depth of from 10 to 20 mm.

18. The process according to claim 1, wherein the spinning solution has a temperature of from 105 to 120° C.

19. The process according to claim 1, wherein a cross draught of air having a velocity of 0.5 to 3 m/sec is provided in the air gap.

20. The process according to claim 19, wherein the cross draught is air having a moisture content in the range of from 0.5 to 10 g water per kg air.

* * * * *